H. T. MAITLAND.
PROCESS OF TREATING HYDROCARBON OILS.
APPLICATION FILED APR. 15, 1919.
1,425,882.
Patented Aug. 15, 1922.
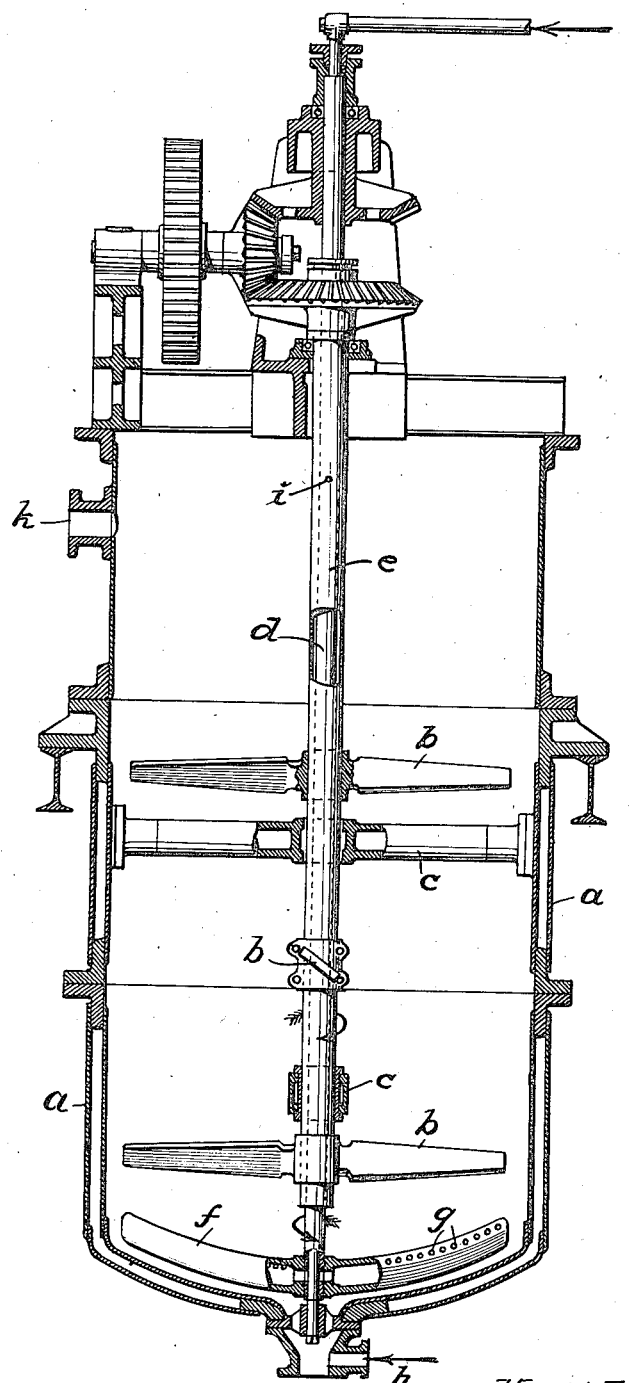
WITNESS:
INVENTOR
Harold T. Maitland
BY
Frank D. Busser
ATTORNEY.

UNITED STATES PATENT OFFICE.

HAROLD T. MAITLAND, OF MARCUS HOOK, PENNSYLVANIA, ASSIGNOR TO SUN COMPANY, OF PHILADELPHIA, PENNSYLVANIA, A CORPORATION OF NEW JERSEY.

PROCESS OF TREATING HYDROCARBON OILS.

1,425,882.     Specification of Letters Patent.     Patented Aug. 15, 1922.

Application filed April 15, 1919. Serial No. 290,227.

*To all whom it may concern:*

Be it known that I, HAROLD T. MAITLAND, a citizen of the United States, residing at Marcus Hook, county of Delaware and State of Pennsylvania, have invented a new and useful Improvement in Processes of Treating Hydrocarbon Oils, of which the following is a full, clear, and exact description, reference being had to the accompanying drawings, which form a part of this specification.

The object of my invention is to produce, by treating mineral oils, saponifiable oils or organic compounds which will have certain characteristics of animal oils, vegetable oils and resins and which are adapted for various uses, some of the principal of which are for the manufacture of soaps, hydrogenated compounds, greases, drying oils, cutting oils, nitrated, sulphonated and chlorinated compounds, and addition, substitution or condensation products, some of which have antiseptic and medicinal properties.

The derivatives from mineral oil produced by my process have peculiar characteristics which no other known derivatives from mineral oil possess, in that they are both insoluble in water and saponifiable, possessing, in the main, when saponified, the qualities of ordinary soaps made from oil of vegetable or animal origin. The products, in the preferred forms in which I have made them, have also the following specific characteristics: They are odorless, they do not become rancid, and when saponified they are miscible in all proportions with water and are miscible in oil, as hereinafter more particularly explained.

The production from mineral oil of sulfo-acids or sulfonic compounds which are saponifiable and when saponified exhibit some of the characteristics of ordinary soap is known. These sulfonated acids, however, are quite different from my novel products both in constitution and in certain essential characteristics. Thus the sulfonated acids contain, as their name implies, a large percentage of sulfur, they are soluble in water, and when saponified they do not undergo the process of hydrolytic decomposition which occurs with ordinary soaps. The sulfur content of my products, on the contrary, is scarcely more than a trace, and exists chiefly in the form of sulfates, which are there as impurities. My products, therefore, are not sulfo-acids or sulfonated compounds in any sense, as they are insoluble in water, and they behave, when saponified, like ordinary soaps in that they undergo the same character of hydrolytic decomposition and exhibit most other, and probably all other, important qualities which characterize ordinary soaps.

My new products cannot, by reason of their novelty, be too specifically designated. They are, however, saponifiable oils or a series of oils and it is scarcely questionable that they are organic acids of the resin group.

The main advantage of my new products is their cheapness, by reason of the cheapness of mineral oils as compared with animal and vegetable oils. They have, however, not only the economical advantage of being derivatives from mineral oils, but they have the further economical advantage of being derivatives from materials which are by-products in the manufacture of lubricating oils and other standard refined products from crude oils, which by-products have hitherto either been wasted or only partially utilized for the manufacture of products which command a comparatively small price. My products have a much greater commercial value than lubricating oil itself, making it profitable to so conduct the whole refining process as to make the production of my new products the chief object.

I have invented two processes for manufacturing my improved products, which are quite different, and while the products are similar and display the characteristics hereinbefore recited, they are not identical. I have herein described, both these processes, but have claimed but one of them, the other process being set forth and claimed in an application filed April 15, 1919. Serial No. 290,228.

In the accompanying drawing, the figure is a vertical sectional view of a mechanical masticator and digester which I prefer to use in carrying out the second of the herein described processes.

It will be understood that the following description applies only to preferred ways of carrying out my process, the efficiency of which has been demonstrated by practical use, and is not intended to limit or restrict the invention within a narrower scope than is defined in the claims.

While any crude petroleum is possibly or probably adapted for use in the execution of my processes, I prefer to use Texas crude oil, or a crude petroleum of that nature, on account of the particular group of hydrocarbons and their mobility to conversion which are found in an oil of this kind. The yield of saponifiable oil is probably increased by the particular distilling process which I preferably employ to secure the so-called lubricating oil stock from which both lubricating oil and my new products are made, and I shall therefore briefly describe such distilling process; although it will be understood that the essential steps of my processes may be practiced starting with any lubricating oil stock, or distillate, or at least any lubricating oil stock or distillate made by distilling crude petroleum of the proper grade in the ordinary way.

I first take the crude petroleum and subject it to a preliminary distillation in which all of the crude product is distilled off except a relatively small percentage of residuum. The distillates are then subjected to a second distillation, the heavier product remaining in the still being the stock from which lubricating oil may be made. The second distillate is then redistilled, light oils being distilled off, the part remaining also being adapted for use as lubricating stock.

While some saponifiable compounds may be separated from the mineral oil treatment with fuller's earth or bone char, followed by extraction of the saponifiable compounds from the above mentioned materials with some solvent such as alcohol, ether, benzol, carbon bisulfide, etc., I prefer to treat them successively with an acid and an alkali, either first treating with an acid and then with an alkali, or the reverse. A certain group of these saponifiable oils may be removed by first precipitating them with an alkali and removing them before treating with sulfuric acid; or I may proceed in the usual way, namely: by first treating the lubricating stock with sulfuric acid or any other suitable acid, with agitation, followed by settlement, forming the "sludge," which is drawn off. If sulfuric acid be used, it should not be the anhydride, or even fuming acid, as otherwise sulfo-acids will be formed, which may be difficult or impossible to eliminate, or which may make impossible the production of the water-insoluble organic acid sought. The treatment of the sludge, for the purpose of producing a saponifiable oil or organic acid having the characteristics hereinbefore enumerated, is hereinafter set forth. After the sludge is separated from the lubricating stock, the lubricating stock is treated with caustic soda or any suitable alkali in the customary way.

The precipitate from the alkali treatment of the lubricating stock which, when drawn off, is usually allowed to run off as waste, is a soap consisting of a sodium salt of the hereinbefore mentioned organic compounds with about sixty per cent of water. I decompose this soap with a dilute mineral acid. A seven per cent solution of sulfuric acid has been found quite satisfactory for this work, although certain variable features in the precipitate from the alkali treatment, such as an extraordinary excess of alkali or an excess or scarcity of water, may, to some extent, govern the strength of this solution. The amount of this solution is controlled entirely by conditions existing in the precipitate from the alkali treatment. It is, however, desirable that the amount of water in this decomposing solution should be sufficient to dissolve and carry away the resultant salts of this reaction. The total amount of water, including the water already present in the precipitate, should approach the total amount of liberated saponifiable oils plus dissolved or suspended mineral oils. The precipitate, which is drawn off, consists chiefly of water containing in solution sodium sulfate, acid sodium sulfate and impurities from the commercial alkali used.

The following more specific example may be given of the practice of the process, starting with the lubricating oil stock and ending with the production of the saponifiable oils or organic acids which remain after drawing off the last named precipitate:

2300 barrels of lubricating stock are thoroughly agitated with approximately 75 barrels of concentrated sulfuric acid (93.5% $H_2SO_4$) and caused to settle by appropriate temperature conditions. This mixture of oil and acid separates into three distinct layers.

The top layer "A" consists of about 2175 barrels of treated lubricating stock, with approximately .75% sulfuric acid in suspension. The lubricating stock consists of certain hydrocarbon oils and other substances, which latter, when treated with caustic soda solution, yield a saponaceous product.

The middle layer "B" is composed of approximately 180 barrels of a mixture of sludge and acid. The lower layer "C" consists of a small amount of sulfuric acid with some sludge in solution. These layers are successively drawn off.

The top layer "A" remaining in the agitator is slowly agitated with about 300 barrels of a weak solution of caustic soda and permitted to settle.

Two layers separate. The top layer "D" consists chiefly of treated lubricating oil amounting, approximately, to 1925 barrels. The bottom layer "E" is a mixture of lubricating oil, soap and alkaline salt water, amounting to about 550 barrels, The lower layer "E" is drawn off and treated by agitation with about 150 barrels of 7% sulfuric acid at approximately 100° C., which causes the soap to be decomposed. Approximately 150 barrels of hot water are then added and the mixture is agitated and allowed to settle. It readily separates into two layers, the upper layer "F" consisting of approximately 250 barrels of saponifiable acids with some mineral oil, while the bottom layer "G", amounting to about 600 barrels, is the salt water resulting from the above reaction.

After drawing off the bottom layer "G", layer "F" may be saponified with caustic soda or other suitable alkali, making a soap containing very little water. A hot solution of approximately 51BeNaOH has been used with very good results. In order to keep the soap bright, the water content is controlled by the strength of the alkali solution. Approximately two to seven per cent of water is permitted to remain in the soap, but the quantity of water incorporated is controlled by the product desired.

In many cases, if sufficient care is taken to allow layer "E" to settle properly, it will separate into three layers, namely: a top layer "H", about 18%, consisting chiefly of mineral oil; a middle layer "I", about 39%, consisting of a soap; and a bottom layer "J", about 43%, of alkaline salts and water.

A soap made in accordance with the foregoing process is adapted for all uses to which soap made from animal or vegetable oils is adapted.

The second process for producing the water-insoluble, saponifiable oil or organic acid hereinbefore described involves the treatment of the "sludge" formed in the sulfuric acid treatment of the lubricating stock. Strictly speaking, this "sludge" comprises two layers, "B" and "C", as hereinbefore explained. The lower layer, consisting of a small amount of sulfuric acid, with some sludge in solution, is drawn off and concentrated. The process involves the special treatment of the middle layer, which contains about 30 per cent sulfuric acid. I subject the same to the concurrent action of hot water and mechanical mastication. The water should be maintained below the boiling point, although it may, if desired, exceed the boiling point toward the end of the operation. The water is preferably continuously introduced during the operation of mastication and steam is introduced with the water to maintain the water at the desired temperature.

The special mechanical masticator and digester which I prefer to employ is equipped with a steam jacket $a$ built to withstand a pressure of one hundred pounds to the square inch. The inside of the digester as well as the movable parts contained within it are covered with some acid resisting metal or composition. Special masticating and stirring paddles $b$ with a certain sweep or pitch are arranged to revolve with a lifting and opposing effect, while stationary interfering bars $c$ serve the double purpose of masticating the sludge and supporting the shafts $d$ and $e$. The undermost paddle $f$ is hollow and operated by the hollow vertical shaft $d$ which moves in an opposite direction to the hollow shaft $e$ containing it. The edges of this paddle which, in rotation, are at the rear, are provided with small openings $g$, through which water, air or steam, or a mixture of two or all of these, may be introduced into the bottom of the digester by means of the hollow shaft $d$. The bottom of the digester is so constructed that large quantities of water, air or steam, or a mixture of them, may be introduced by means of an auxiliary pipe or pipes $h$. The annular space between the two shafts is flushed with steam or water, entering at $i$, so that corrosive chemicals do not come in contact with the unprotected surfaces. Before the sludge is introduced, the digester is partially filled with cold water at a temperature of approximately 20 degrees C. The desired temperature is maintained throughout the operation by means of the steam jacket and live steam blown into the contents through pipes $d$ and $h$. The introduction of the washing liquid may be intermittent, but it is preferably continuous, the surplus liquid passing upward through the sludge and out through an overflow $k$, carrying with it the undesirable mineral acid and certain other compounds which may be subsequently treated but the treatment of which forms no part of the present invention. The driving mechanism is so adjusted that the velocity of the masticators or paddles may be diminished or increased at will. The temperature of the contents and the velocity of the masticators are governed entirely by the condition of the sludge as the operation proceeds. The sludge is tested for mineral acidity at certain intervals and when the mineral acid content has been reduced to such an extent (say to approximately two per cent) as to give no trouble in the manufacture of the products desired from the sludge, the washing is stopped and the excess washing liquid is siphoned or drawn off. During the first part of the operation it is important that no air be permitted to be mixed with the sludge, as the buoyant air with the sulfur dioxide causes the small particles of sludge to rise to the surface and to be carried away with the washing liquid. The residual compounds settling to the bottom of digester are saponifiable oils containing some dissolved or suspended mineral oil.

The product of this second process is not identical with that of the first process, the chief difference being that the product of the first process is in liquid form, while the product of the second process is a solid. The second product, like the first, is a water-insoluble organic acid, is practically odorless, does not become rancid, and when saponified displays the principal qualities of ordinary soap. Both products may be readily saponified with caustic alkali or other suitable alkali. Both soaps form with water colloidal solutions similar to that formed with water by any soap of animal or vegetable origin. This solution with water of the second saponified product, upon drying, partially hydrolyzes and does not readily dissolve in water the second time; making an ideal road oil or dust preventative. The first product, when saponified, is soluble in all proportions with mineral oil. The second product, when saponified, is partially soluble in mineral oil, the degree of its solubility depending upon the character of the oil. Both soaps, when mixed with mineral oil and water, form homogeneous emulsions.

The sulfur content of the first product is about 0.2 per cent, while the proportion of sulfur in the second product is about 0.4 per cent. This minute proportion of sulfur probably exists as sulfates whose absolutely complete removal has not been effected.

I do not herein claim the product or products herein described, the same forming the subject-matter of a separate application, Serial No. 290,229, filed April 15, 1919.

Having now fully described my invention, what I claim and desire to protect by Letters Patent is:

1. In the manufacture of a water-insoluble saponifiable product from mineral oil, the process which comprises distilling from the petroleum a relatively heavy distillate adapted for lubricating oil stock, treating the same with sulfuric acid and separating out the sludge with a large part of the acid, treating the remaining body of acid-containing oil with an alkali, separating out the soap and alkaline salt water, decomposing the soap with a relatively weak solution of a mineral acid, and eliminating most of the salt water, leaving a derivative comprising principally a water-insoluble organic acid.

2. In the manufacture from mineral oil of a soap possessing largely the qualities of soap derived from animal and vegetable sources, the process which comprises distilling from the petroleum a relatively heavy distillate adapted for lubricating oil stock, treating the same with sulfuric acid and separating out the sludge with a large part of the acid, treating the remaining body of acid-containing oil with an alkali, separating out the soap and alkaline salt water, decomposing the soap with a relatively weak solution of a mineral acid, eliminating from the product most of the salt water and saponifying said product, thereby forming a soap having substantially the characteristics of ordinary soap of animal or vegetable origin.

In testimony of which invention, I have hereunto set my hand, at Philadelphia, Pa., on this 28th day of March, 1919.

HAROLD T. MAITLAND.